(12) United States Patent
Yang et al.

(10) Patent No.: US 7,885,154 B2
(45) Date of Patent: Feb. 8, 2011

(54) APPARATUS FOR CONTROLLING DISCRETE DATA IN DISK OVERWRITE AREA OR POWER CALIBRATION AREA

(75) Inventors: Jin-Bin Yang, Chang Hua Hsien (TW); Meng-Ta Yang, Miao Li Hsien (TW)

(73) Assignee: Mediatek Incorporation, Hsin-Chu (TW)

( * ) Notice: Subject to any disclaimer, the term of this patent is extended or adjusted under 35 U.S.C. 154(b) by 868 days.

(21) Appl. No.: 11/366,476

(22) Filed: Mar. 3, 2006

(65) Prior Publication Data

US 2007/0140081 A1 Jun. 21, 2007

(30) Foreign Application Priority Data

Dec. 16, 2005 (TW) .............................. 94144831 A (51) Int. Cl.
G11B 7/00 (2006.01)
(52) U.S. Cl. ................ 369/47.28; 369/47.27; 369/47.5; 369/47.35
(58) Field of Classification Search ................ 369/47.5, 369/47.17, 47.49
See application file for complete search history.

(56) References Cited

U.S. PATENT DOCUMENTS

| | | | |
|---|---|---|---|
| 6,091,688 A | 7/2000 | Tanoue et al. | |
| 6,201,778 B1 * | 3/2001 | Sensyu | 369/53.34 |
| 7,002,895 B1 * | 2/2006 | Taussig | 369/275.1 |
| 2002/0159350 A1 | 10/2002 | Ogura et al. | |
| 2002/0172114 A1 | 11/2002 | Shimizu et al. | |
| 2004/0037186 A1 | 2/2004 | Iijima et al. | |
| 2005/0008102 A1 * | 1/2005 | Rapp et al. | 375/340 |
| 2005/0213481 A1 * | 9/2005 | Ando et al. | 369/275.3 |

* cited by examiner

Primary Examiner—Wayne R Young
Assistant Examiner—Adam R Giesy
(74) Attorney, Agent, or Firm—Birch, Stewart, Kolasch & Birch, LLP (57) ABSTRACT

An apparatus for controlling discrete data in a disk overwrite area or a power calibration area comprises a signal-processing unit, an address-processing unit, a control signal-processing unit, a clock recovery circuit, a signal-processing unit parameter control unit, and a clock recovery circuit parameter control unit, wherein the control signal-processing unit uses a message produced by a data on the disc to determine the control signals such as hold, load, or increasing bandwidth for holding, loading, and increasing the bandwidth of the parameters for processing the related circuits (such as the circuit of the signal-processing unit or the clock recovery circuit) of the discrete data produced between the two data clusters, so as to increase the convergent speed of the circuits for assuring the accuracy of reading data.

58 Claims, 5 Drawing Sheets

APPARATUS FOR CONTROLLING DISCRETE DATA IN DISK OVERWRITE AREA OR POWER CALIBRATION AREA

BACKGROUND OF THE INVENTION

1. Field of the Invention

The present invention relates to an apparatus for controlling discrete data in a disk overwrite area or a power calibration area, and more particularly to an apparatus for controlling discrete data produced between two data clusters when reading a data burned into a Blu-Ray disc.

2. Description of Related Art

Since people are increasingly having higher requirements for optical storage products and technologies, optical discs have evolved from CDs and DVDs to Blu-Ray discs. Thereby the capacity of discs has increased from a CD's capacity of 650 MB and a DVD's capacity of 4.7 GB to the Blu-Ray disc's capacity of 22 GB. The laser wavelength has become shorter, the track pitch has become smaller, and the pit on the disc has become shorter. Because of these changes the level of difficulty for decoding data becomes relatively high.

Figure 1:
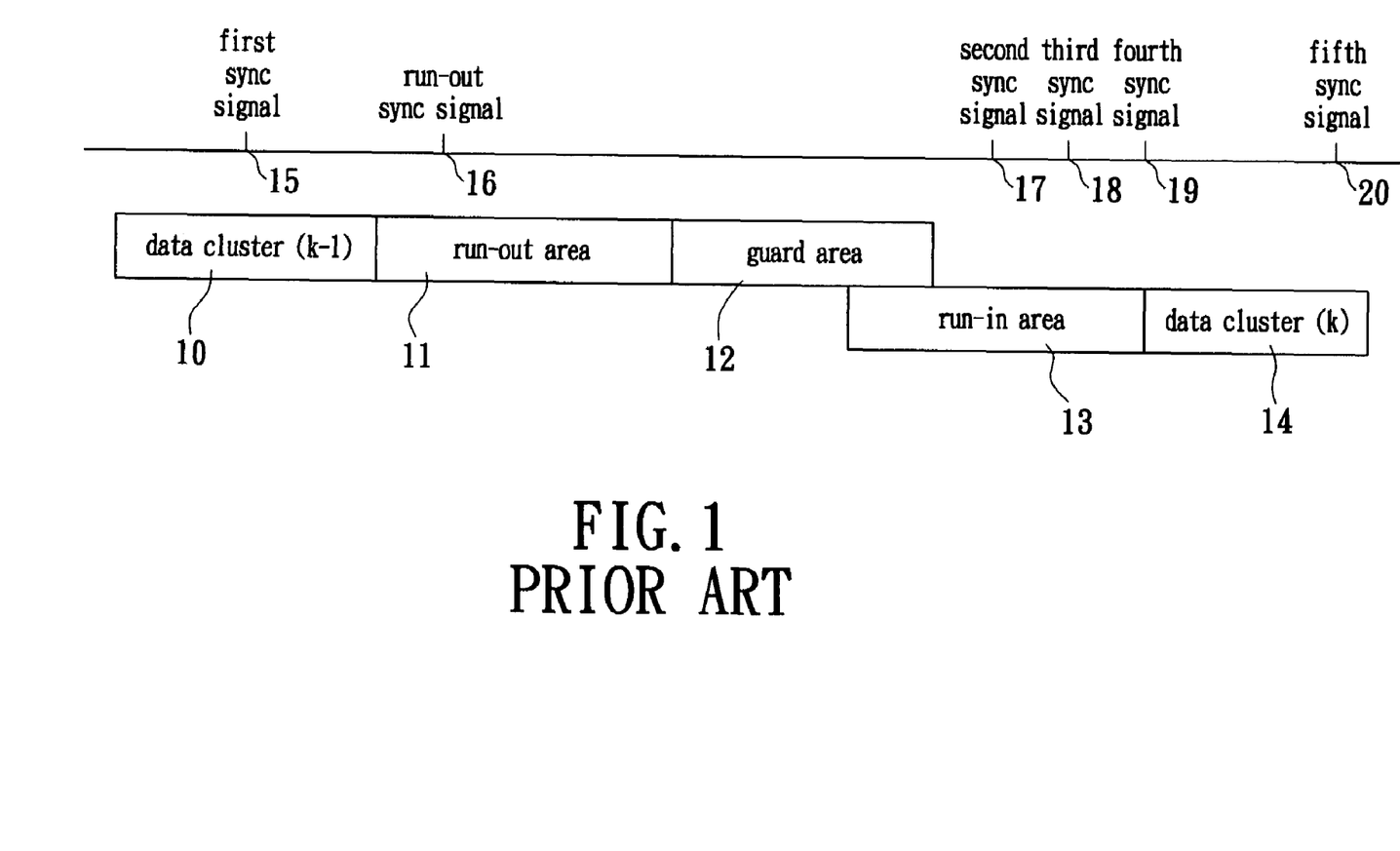
FIG. 1 is a schematic view of discrete data produced between two data clusters when a prior art Blu-Ray disc is burned.
Figure 2:
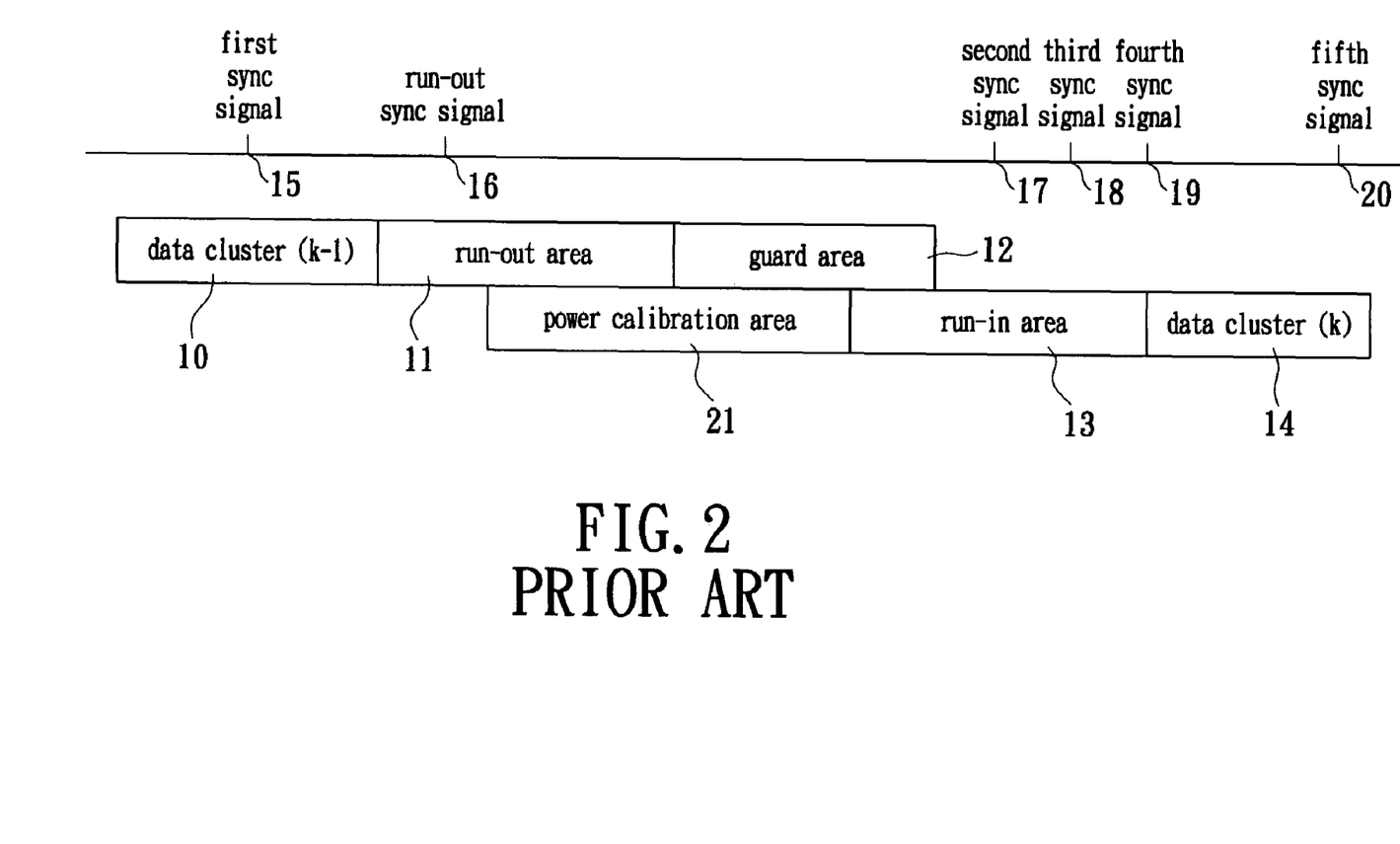
FIG. 2 is another schematic view of discrete data produced between two data clusters when a prior art Blu-Ray disc is burned.

Refer to FIG. 1 for a schematic view of discrete data produced between two data clusters when a Blu-Ray disc is burned and FIG. 2 for another schematic view of discrete data produced between two data clusters when a Blu-Ray disc is burned. After the previous data cluster (k−1) 10 is written and before the next data cluster (k) 14 is written, a run-out area 11 and a guard area 12 will have a run-in area 13, and these two data clusters 10, 14 can be written from different optical disk drives or written twice from the same optical disk drive. If the two data clusters 10, 14 are written from different optical disk drives, the properties of signals in the data area behind the run-in area 13 and in front of the next data cluster 14 will have discrete phenomenon, such as the magnitude of signals. Even if the two data clusters 10, 14 are written from the same optical disk drive, there will be a data overwrite area between the two data clusters, and thus the phase and frequency of the clock will be discrete. For example, a sync signal will produce several irregular sync signals such as a second sync signal 17 and a third sync signal 18 after going through a first sync signal 15 and a run-out area sync signal 16, and will then recover its normal sync signal such as a fourth sync signal 19 and a fifth sync signal 20.

The specifications of a Blu-Ray disc include a power calibration area (PCA) 21 designed in front of the foregoing run-in area 13. In the power calibration area 21, various patterns and laser powers are used for the write-in testing, and the properties of the signals are similar to or even worse than those of the foregoing overwrite area.

Therefore, the signals of a rewritable disc (RW disc) or a recordable disc (R disc) that allow data to be written in certain continuous sections will become poor in these areas or different from the normal adjacent front or rear signals in the areas, since the signals are written or tested repeatedly. As a result, it will be difficult to decode the data.

Figure 3A:
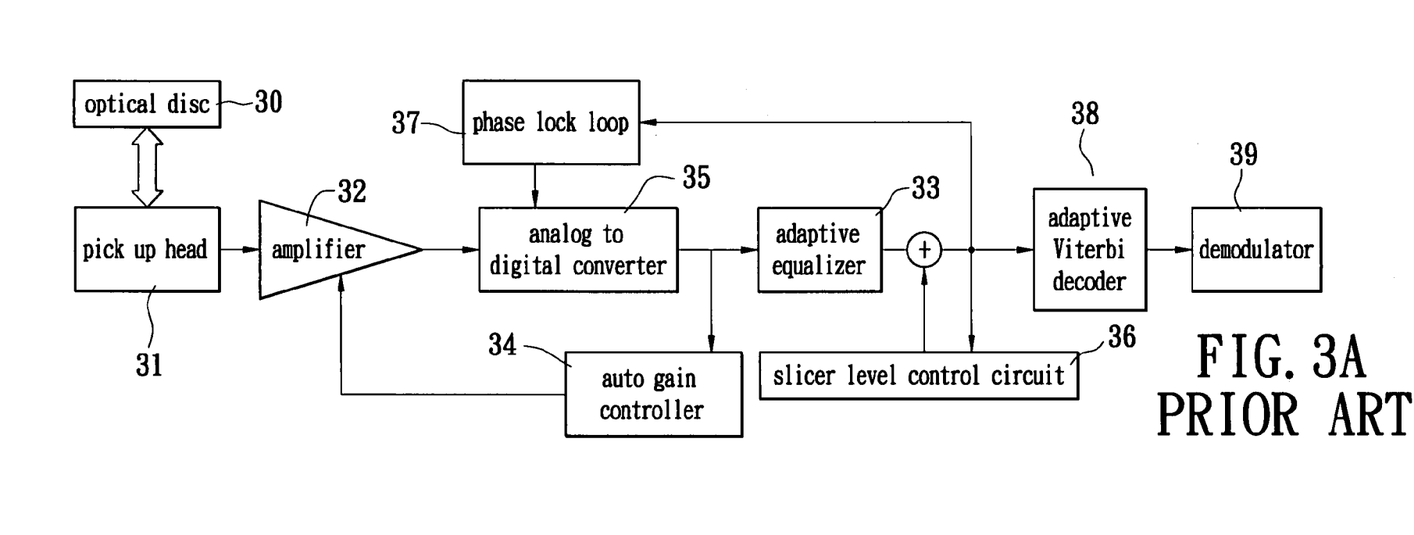
FIG. 3A is a block diagram of a prior art optical disk drive signal processing system.

Referring to FIG. 3A for the block diagram of a prior art optical disk drive signal processing system, the signal processing system adopts a digital processing structure. A pick up head (PUH) 31 reads a radio frequency signal on an optical disc 30 and outputs the radio frequency signal to an amplifier 32, and then the amplifier 32 amplifies the radio frequency signal. After an analog to digital converter (ADC) 35 converts a radio frequency analog signal into a radio frequency digital signal and outputs the radio frequency digital signal to an equalizer 33, an auto gain control (AGC) 34 adjusts the amplifier 32 according to the digitized radio frequency signal to maintain the magnitude of the radio frequency signal, and the equalized signal goes through a slicer level controller 36 to remove the low and mid frequency portions of the data, so that the center can be aligned correctly, and a basic clock (PLCK) is obtained from a phase lock loop (PLL) 37, and an adaptive Viterbi decoder 38 and a demodulator 39 decode the required data for output.

Figure 3B:
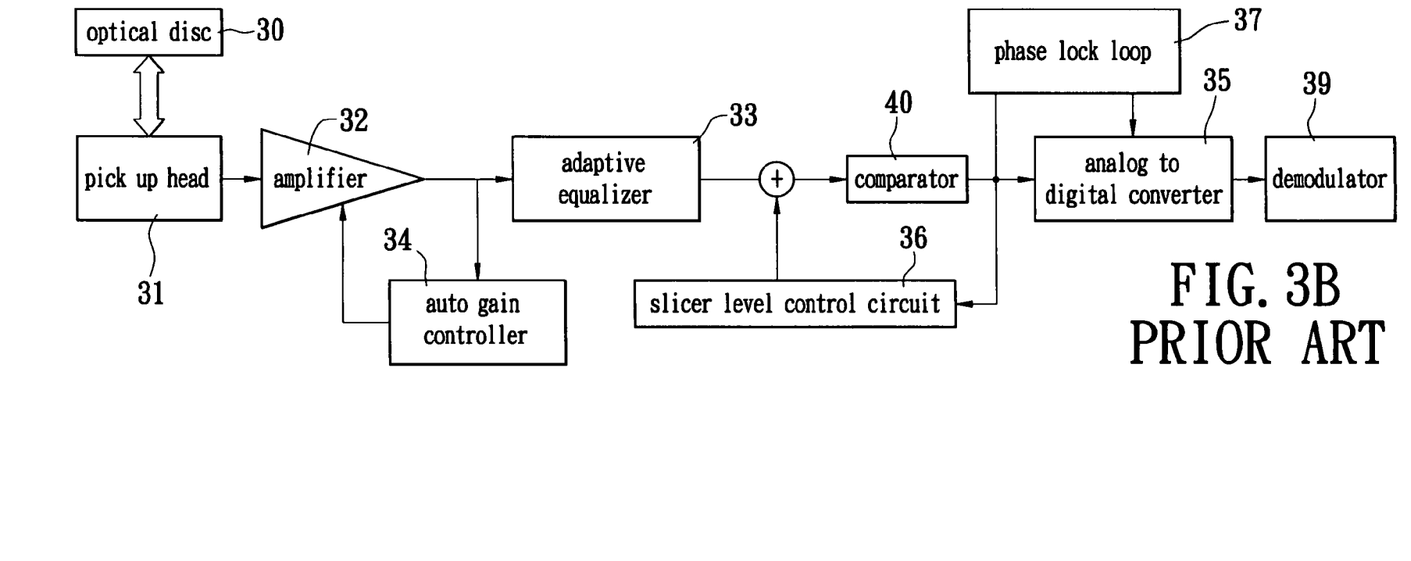
FIG. 3B is a block diagram of another prior art optical disk drive signal processing system.

Referring to FIG. 3B for the block diagram of a prior art optical disk drive signal processing system, the signal processing system adopts an analog processing method. The pick up head 31 reads a radio frequency signal from the optical disc 30 and outputs the radio frequency signal to the amplifier 32, and the amplifier 32 amplifies the radio frequency signal, and the auto gain amplifier 34 adjusts the amplifier 32 according to the digitized radio frequency signal to maintain the magnitude of the radio frequency signal and uses the equalizer 33 to compensate the radio frequency signal. The equalized signals go through the slicer level controller 36 and a comparator 40 to remove the mid and low frequency portions of the data, so that the center can be aligned correctly. The analog to digital converter 35 converts analog signals into digital signals, and the phase lock loop 37 takes out a basic clock and uses a demodulator 39 to decode the required data for output.

When the foregoing prior art optical disk drive signal processing system processes discrete data produced between two data clusters of the Blu-Ray disc, errors often occur when the signals are used for processing related circuits such as the phase lock loop, slicer level control circuit, auto gain amplifier, equalizer, and adaptive Viterbi decoder, because the properties of signals in front of and behind the run-in area are very different. As a result, it takes more time to recover the related parameters, if possible, when recovering to the normal area, or a poor value is converged or a lock is lost causing a higher error percentage in the signal, and even resulting in failures of decoding signals or reading data.

SUMMARY OF THE INVENTION

In view of the foregoing shortcomings, the present invention provides an apparatus for controlling discrete data in a disk overwrite area or a power calibration area, such that when the data burned in the Blu-Ray disc is read, the related circuit of the discrete data produced between the two data clusters maintains the parameters of these circuits in a hold state to increase the convergent speed of the circuits for assuring the accuracy of reading data.

The present invention provides an apparatus for controlling discrete data in a disk overwrite area or a power calibration area, such that a data burned in the Blu-Ray disc is read, the related circuits of the discrete data produced between the two data clusters load the parameters of these circuits, such as the normal converged parameters read previously or the parameters read from the converging area in the future, so as to increase the convergent speed of the circuits for assuring the accuracy of reading data.

The present invention provides an apparatus for controlling discrete data in a disk overwrite area or a power calibration area, such that when the data burned in the Blu-Ray disc is read, the related circuits of the discrete data produced between the two data clusters increase the bandwidth of the parameter adjust circuit of these circuits, so as to increase the convergent speed of the circuits for assuring the accuracy of reading data.

To achieve the foregoing objectives, the apparatus for controlling discrete data in a disk overwrite area or a power calibration area of the invention comprises: a signal-processing unit for receiving an analog radio frequency signal and converting the analog radio frequency signal into a digital signal; an address-processing unit coupled to the signal-processing unit for decoding the digital signal into a sync signal and/or an address signal of a main data or taking out a sync signal or an address signal of a wobble signal; a control signal-processing unit coupled to the address-processing unit for receiving a sync signal and/or an address signal of the main data or the wobble signal to issue a hold, a load, and/or an increasing bandwidth control signal; a signal-processing unit parameter control unit coupled to the control signal-processing unit for receiving the hold, load, and/or increasing bandwidth control signals, such that the signal-processing unit executes the parameters for the operations of hold, load, and increasing bandwidth, so as to increase the convergent speed of the circuit of the signal-processing unit for assuring the accuracy of reading data from the disc; and a clock recovery circuit coupled to the signal-processing unit.

To achieve the foregoing objectives, the apparatus for controlling discrete data in a disk overwrite area or a power calibration area of the invention comprises: a signal-processing unit for receiving an analog radio frequency signal and converting the analog radio frequency signal into a digital signal; an address-processing unit coupled to the signal-processing unit for decoding the digital signal into a sync signal and/or an address signal of a main data or taking out a sync signal and/or an address signal of a wobble signal; a control signal-processing unit coupled to the address-processing unit for receiving the sync signal and/or address signal of the wobble signal of the main data to issue a hold, a load, and an increasing bandwidth control signal; a clock recovery circuit coupled to the signal-processing unit; a clock recovery circuit parameter control unit coupled to the control signal-processing unit for receiving the hold, load, and/or increasing bandwidth control signals, such that the clock recovery circuit executes the parameters for the hold, load, and/or increasing bandwidth operations, so as to increase the convergent speed of the circuit of the clock recovery circuit for assuring the accuracy of reading data from a disc.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The present invention is illustrated with a preferred embodiment and attached drawings. However, the invention is not intended to be limited thereby.

Figure 4:
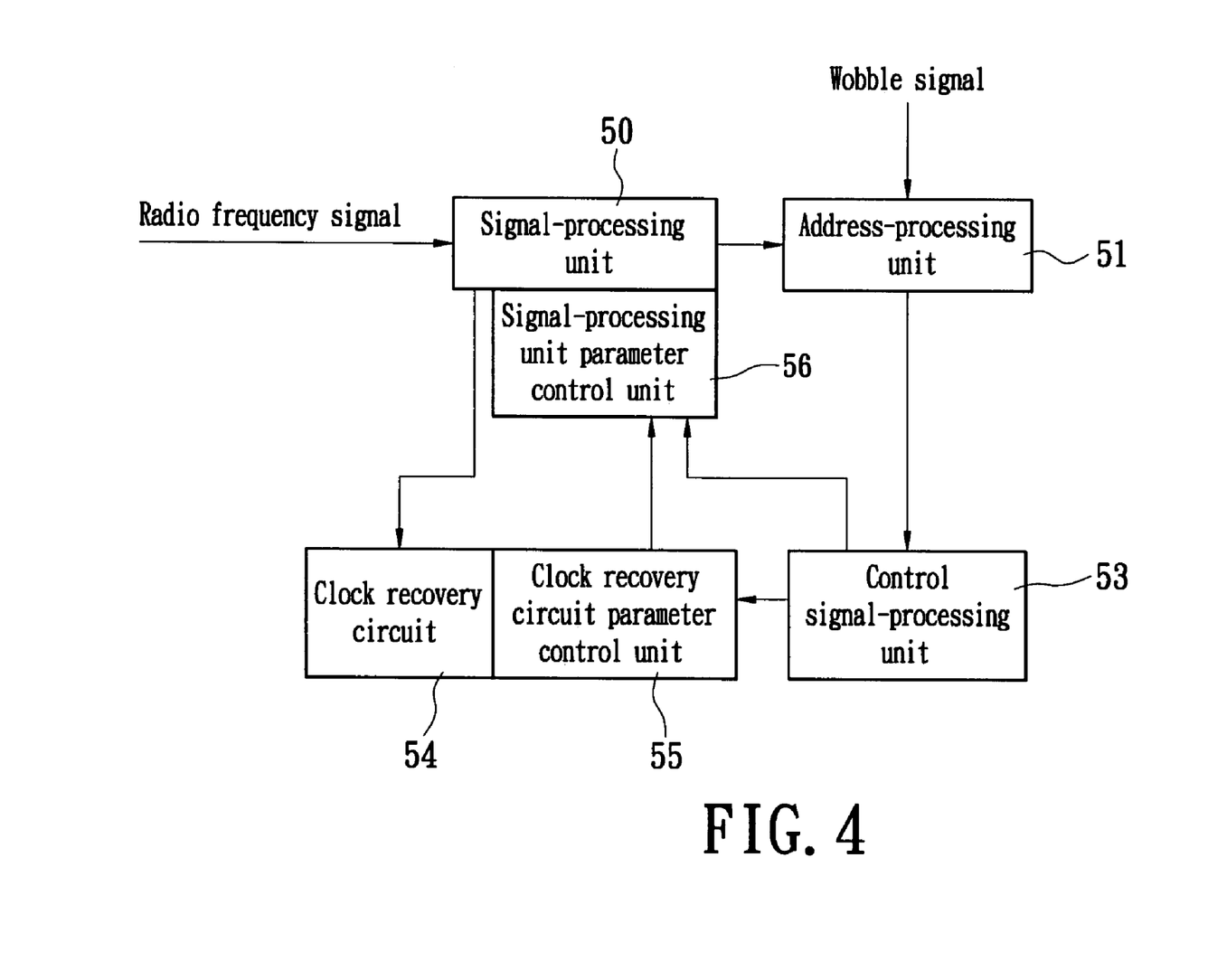
FIG. 4 is a block diagram of a control device of the present invention.

Referring to FIG. 4 for the apparatus for controlling discrete data in a disk overwrite area or a power calibration area in accordance with the present invention, the control device can process signals having very different properties produced when repeatedly writing data into an overwrite area or a power calibration area. The convergent speed of a circuit is increased to assure the accuracy of reading data from a disc. The control device comprises a signal-processing unit 50, an address-processing unit 51, a control signal-processing unit 53, a clock recovery circuit 54, a signal-processing unit parameter control unit 56, and a clock recovery circuit parameter control unit 55.

The signal-processing unit 50 processes a radio frequency (RF) signal read from an optical disc by a pick up head, and the signal-processing unit parameter control unit 56 receives a hold control signal transmitted from the control signal-processing unit 53, and the internal signals of the signal-processing unit 50 are fed back, adjusted, and paused to temporarily hold the previous control result. The signal-processing unit 50 comprises a slicer level control circuit, an auto gain amplifier, an equalizer, and an adaptive Viterbi decoder (not shown in the figure), wherein the equalizer is used for compensating the phase and gain of the radio frequency signal, the auto gain amplifier is used for maintaining the magnitude of the radio frequency signal, and the slicer level control circuit removes the mid and low frequency portions of the data, so as to align the center correctly.

The address-processing unit 51 is coupled to the signal-processing unit 50 for decoding the radio frequency signal that is processed into a digital signal to obtain a sync signal and an address signal of a main data and a sync signal and an address signal of a wobble signal.

The control signal-processing unit 53 is coupled to the address-processing unit 51 and uses a wobble signal, such as a sync signal or an address signal of the main data of an optical disc obtained by the address-processing unit 51 to send the hold control signal to the signal-processing unit parameter control unit 56.

The signal-processing unit parameter control unit 56 is coupled to the control signal-processing unit 53 for receiving the control signal-processing unit 53 to issue a hold signal for maintaining the signal-processing unit 50 in a hold state.

The clock recovery circuit parameter control unit 55 is coupled to the control signal-processing unit 53 for receiving a signal transmitted from the control signal-processing unit 53 to maintain the clock recovery circuit 54 (which is a phase lock loop) at a hold. In other words, the clock adjusting function is disabled temporarily to maintain the previous clock temporarily, so that the related circuits of the signal-processing unit 50 and the clock recovery circuit 54 do not fall into a situation in which they are unable to diverge to a parameter for receiving normal signals when the data passes through the data overwrite area and the properties of the radio frequency signal on the optical disc become poor or have a large difference. Therefore, the signal-processing unit parameter control unit 56 and the clock recovery circuit parameter control unit 55 operating with a control signal of the control signal-processing unit 53 can maintain the parameters of these circuits in a hold state to increase the convergent speed of the circuits for assuring the accuracy of reading data.

In FIG. 4, the control signal-processing unit 53 is coupled to the address-processing unit 51 and uses the messages of the disc data and the wobble signal such as a sync signal and an address obtained by the address-processing unit 51 to issue a load control signal.

The signal-processing unit parameter control unit 56 is coupled to the control signal-processing unit 53 for receiving a signal sent from the control signal-processing unit 53 and the loading the parameter specified for the signal-processing unit 50, and the clock recovery circuit parameter control unit 55 is used for receiving a signal sent from the control signal-processing unit 53 and loading a load parameter specified for the clock recovery circuit 54. The specific parameter could be a normal convergent parameter obtained from a previous reading or a convergent parameter read from an area in the future, such that the related circuits of the signal-processing unit 50 and the clock recovery circuit 54 will not result a related circuit that cannot converge the parameters to a normal signal when the signal passes through the data overwrite area due to the properties of the radio frequency signal on the disc becoming poor or having a large difference.

Therefore, the signal-processing unit parameter control unit 56 and the clock recovery circuit parameter control unit 55 operating with the control signal of the control signal-processing unit 53 can load better parameters for these circuits to increase the convergent speed of the circuits for assuring the accuracy of reading data.

In FIG. 4, the control signal-processing unit 53 coupled to the address-processing unit 51 uses a message such as a sync signal and an address of a disc data, or a wobble signal obtained by the address-processing unit 51 to issue an increasing bandwidth control signal. The increasing bandwidth circuit is provided for receiving the increasing bandwidth control signal to increase the bandwidth of the signal-processing unit 50.

Furthermore, the signal-processing unit parameter control unit 56 is coupled to the control signal-processing unit 53 for receiving a signal sent from the control signal-processing unit 53 and increasing the bandwidth of the signal-processing unit 50. The increased bandwidth improves the gain of the circuit such that the related circuits of the signal-processing unit 50 will not fall into a situation of being unable to be diverged to a parameter for receiving normal signals when the data passes through the data overwrite area and the properties of the radio frequency signal on the optical disc become poor or have a large difference. The clock recovery circuit parameter control unit 55 is provided for receiving a signal transmitted from the control signal-processing unit 53 and increasing the bandwidth of the clock recovery circuit 54.

Therefore, the signal-processing unit parameter control unit 56 and the clock recovery circuit parameter control unit 55 operating with the control signal of the control signal-processing unit 53 can increase the bandwidth of these circuits to increase the convergent speed of the circuits for assuring the accuracy of reading data.

Figure 5:
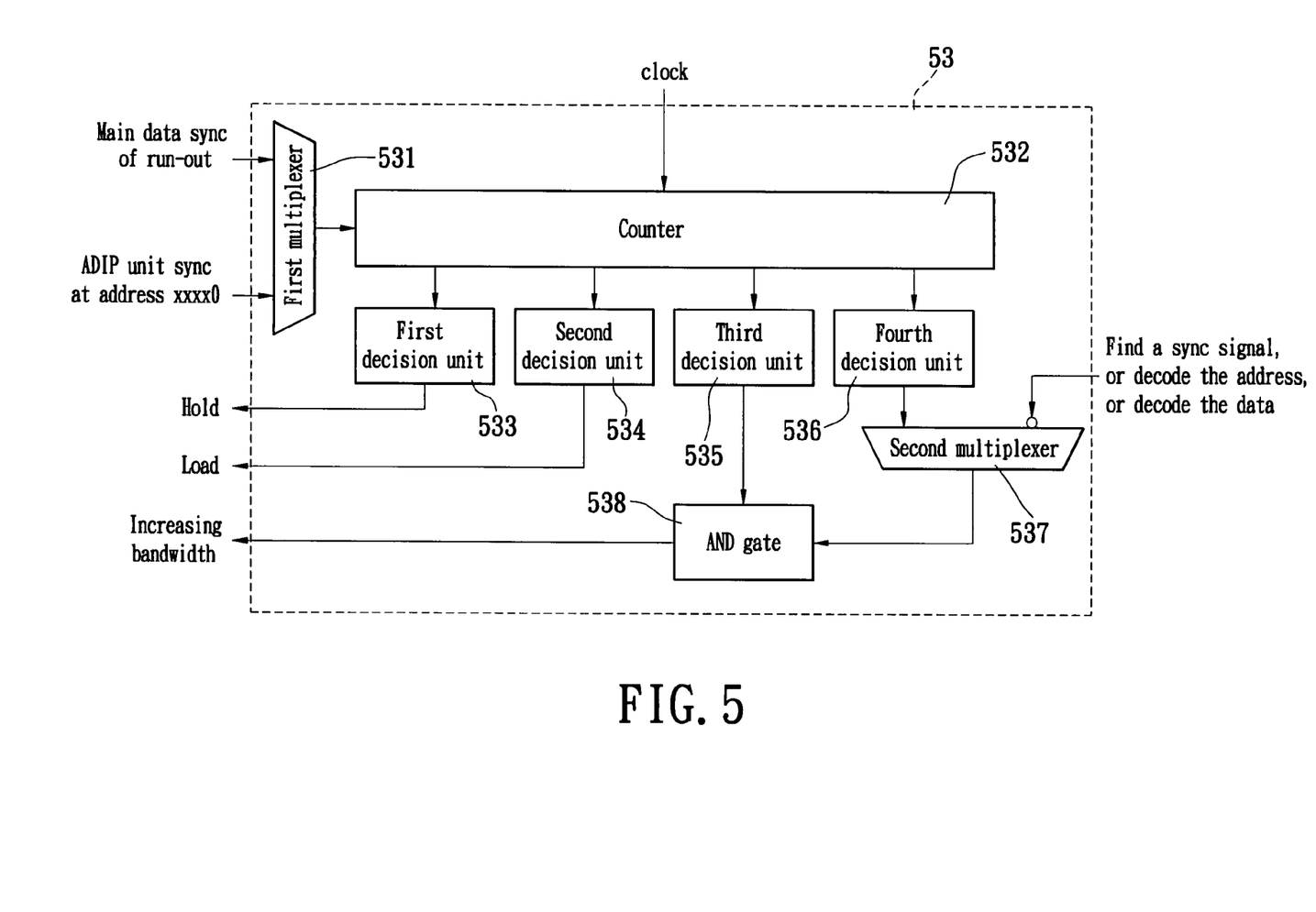
FIG. 5 is a schematic view of a control signal-processing unit of the present invention.

Referring to FIG. 5 for the schematic view of a control signal-processing unit of the present invention, the messages of a disc data or a wobble signal, such as a sync signal and an address signal obtained by the control signal-processing unit 53, are used to trigger a control signal. The control signal-processing unit 53 comprises a first multiplexer 531, a counter 532, a first decision unit 533, a second decision unit 534, a third decision unit 535, a fourth decision unit 536, a second multiplexer 537, and an AND gate 538.

The control signal-processing unit 53 uses the counter 532 to count the messages provided by the main data of a disc or the wobble signal such as a sync signal and an address for estimating where to enter into the overwrite area and/or the power calibration area, where to enter into the data area, or the already entered data area. Firstly, the first multiplexer 531 sends out a reset signal to clear the counter 532 to zero, and the source of the reset signal is a main data sync of run-out and an ADIP unit 8 sync at address xxxx0.

Then, the first decision unit 533, the second decision unit 534, the third decision unit 535, and the fourth decision unit 536 are used to determine the timing for carrying out a hold, and/or a load, and/or increasing bandwidth control signals. The related circuits of the signal-processing unit 50 (including a slicer level control circuit, an auto gain amplifier, an equalizer, and an adaptive Viterbi decoder) and the clock recovery circuit 54 execute the holding parameters, loading parameters, and increasing bandwidth parameters. In this preferred embodiment, a first parameter, a second parameter, and a third parameter are set, wherein the first parameter is a starting time for reading the overwrite area or the power calibration area, and the second parameter is an ending time for reading the overwrite area or the power calibration area, and the third parameter is a starting time for reading a next record of data. The three kinds of parameters can be obtained from the link rule in the specifications and the relative relation between the wobble signal and the main data.

In the first decision unit 533, exiting the overwrite area or the power calibration area if the value of the counter 532 is greater than the first parameter and smaller than the second parameter, and then issuing a hold control signal, such that the related circuits of the signal-processing unit 50 (including the slicer level control circuit, auto gain amplifier, equalizer and adaptive Viterbi decoder) and the clock recovery circuit 54 execute the parameter for the holding operation to increase the convergent speed of the circuits for assuring the accuracy of reading data.

In the second decision unit 534, exiting the overwrite area or the power calibration area if the value of the counter 532 is equal to the second parameter to issue a load control signal, such that the related circuits of the signal-processing unit 50 and the clock recovery circuit 54 execute the parameter for the loading operation to increase the convergent speed of the circuits for assuring the accuracy of reading data.

If the value of the counter 532 is greater than the second parameter in the third decision unit 535 and the value of the counter 532 is greater than the second parameter and smaller than the third parameter in the fourth decision unit 536, it will be time to exit the overwrite area or the power calibration area and start entering into the next record of data, and an increasing bandwidth control signal is sent out, such that the related circuits of the signal-processing unit 50 and the clock recovery circuit 54 execute the operation of increasing the bandwidth to increase the convergent speed of these circuits for assuring the accuracy of reading data. Of course, the ending time of increasing bandwidth can be triggered by a signal such as the sync found, the address OK, and the decode OK signals. Therefore, the second multiplexer 537 and the AND gate 538 are used to form the increasing bandwidth control signal.

In summation of the description above, the present uses the messages provided by the data on the disc or the wobble signal to determine the timing for the hold, load, and increasing bandwidth operations. In the practice of the present invention, these three methods are implemented separately or jointly, and the timing for triggering the control signal is not specified to a specific timing, but can also be in the neighborhood of such specific timing.

While the invention has been described by means of a specification with accompanying drawings of specific embodiments, numerous modifications and variations could be made thereto by those skilled in the art without departing from the scope and spirit of the invention set forth in the claims.

What is claimed is:

1. An apparatus for controlling discrete data in a disk overwrite area or a power calibration area, comprising:
 a signal-processing unit, for receiving an analog radio frequency signal and converting said analog radio frequency signal into a digital signal;
 an address-processing unit, coupled to said signal-processing unit for decoding said digital signal into a sync signal or an address signal of a main data, or taking out a sync signal or an address signal of a wobble signal;
 a control signal-processing unit, coupled to the address-processing unit for receiving said sync signal or said address signal of said main data, or said wobble signal to issue a hold, a load, or an increasing bandwidth control signal;
 a signal-processing unit parameter control unit, coupled to said control signal-processing unit for receiving said hold, load, or increasing bandwidth control signal, such that said signal-processing unit executes a parameter for said hold, load, or increasing bandwidth operations, so as to increase the convergent speed of the circuit of said signal-processing unit and assure the accuracy for reading data in a disc; and
 a clock recovery circuit, coupled to said signal-processing unit.

2. The apparatus for controlling discrete data in a disk overwrite area or a power calibration area of claim 1, wherein said signal-processing unit comprises a slicer level control circuit, an auto gain control, an equalizer, and an adaptive Viterbi decoder.

3. The apparatus for controlling discrete data in a disk overwrite area or a power calibration area of claim 1, wherein said control signal-processing unit comprises a counter for counting said sync signal or said address signal of said main data or said wobble signal.

4. The apparatus for controlling discrete data in a disk overwrite area or a power calibration area of claim 3, wherein said control signal-processing unit comprises a multiplexer for producing a reset signal to clear said counter, according to a sync signal in said run-out area of said main data and a sync signal of said wobble signal having 0 as the end bit of its address.

5. The apparatus for controlling discrete data in a disk overwrite area or a power calibration area of claim 4, wherein said control signal-processing unit includes a first decision unit for issuing said hold control signal, if the value of said counter is greater than a first parameter and smaller than a second parameter said signal-processing unit executes said parameter for a holding operation.

6. The apparatus for controlling discrete data in a disk overwrite area or a power calibration area of claim 5, wherein said first parameter is a starting time for reading said overwrite area or said power calibration area, and said second parameter is an ending time for reading said overwrite area or said power calibration area.

7. The apparatus for controlling discrete data in a disk overwrite area or a power calibration area of claim 4, wherein said control signal-processing unit includes a second decision unit for issuing said load control signal if the value of said counter is equal to said second parameter, such that said signal-processing unit executes said parameter for a loading operation.

8. The apparatus for controlling discrete data in a disk overwrite area or a power calibration area of claim 4, wherein said control signal-processing unit includes a third decision unit for issuing said increasing bandwidth control signal, if the value of said counter is greater than said second parameter said signal-processing unit executes the operation of increasing bandwidth.

9. The apparatus for controlling discrete data in a disk overwrite area or a power calibration area of claims 7, wherein said second parameter reads said ending time for reading said overwrite area or said power calibration area.

10. The apparatus for controlling discrete data in a disk overwrite area or a power calibration area of claim 4, wherein said control signal-processing unit is a fourth decision unit for issuing said increasing bandwidth control signal, if the value of said counter is greater than said second parameter and smaller than said third parameter said signal-processing unit executes the operation of increasing bandwidth.

11. The apparatus for controlling discrete data in a disk overwrite area or a power calibration area of claim 10, wherein said second parameter is an ending time of reading said overwrite area or said power calibration area, and said third parameter is a starting time of reading a next record of data.

12. An apparatus for controlling discrete data in a disk overwrite area or a power calibration area, comprising:
 a signal-processing unit, for receiving an analog radio frequency signal and converting said analog radio frequency signal into a digital signal;
 an address-processing unit, coupled to said signal-processing unit for decoding said digital signal into a sync signal or an address signal of a main data, or taking out a sync signal or an address signal of a wobble signal;
 a control signal-processing unit, coupled to said address-processing unit for receiving of said sync signal or said address signal of said wobble signal of said main data to issue a hold, a load, or an increasing bandwidth control signal;
 a clock recovery circuit, coupled to said signal-processing unit; and
 a clock recovery circuit parameter control unit, coupled to said control signal-processing unit for receiving said hold, said load, or said increasing bandwidth control signal, said clock recovery circuit executes the operation of said hold, said load, or said increasing bandwidth to increase the convergent speed of the circuit of said clock recovery circuit for assuring the accuracy of reading data in a disc.

13. The apparatus for controlling discrete data in a disk overwrite area or a power calibration area of claim 12, wherein said clock recovery circuit is a phase lock loop.

14. The apparatus for controlling discrete data in a disk overwrite area or a power calibration area of claim 12, wherein said control signal-processing unit includes a counter for counting said sync signal or said address signal of said main data or said wobble signal.

15. The apparatus for controlling discrete data in a disk overwrite area or a power calibration area of claim 14, wherein said control signal-processing unit includes a multiplexer for producing a reset signal to clear said counter according to a sync signal in said run-out area of said main data and a sync signal of said wobble signal having 0 as an end bit of its address.

16. The apparatus for controlling discrete data in a disk overwrite area or a power calibration area of claim 15, wherein said control signal-processing unit includes a first decision unit for issuing said hold control signal, if the value of said counter is greater than a first parameter and smaller than a second parameter, said clock recovery circuit executes said parameter for a holding operation.

17. The apparatus for controlling discrete data in a disk overwrite area or a power calibration area of claim 16, wherein said first parameter is a starting time for reading said overwrite area or said power calibration area, and said second parameter is an ending time for reading said overwrite area or said power calibration area.

18. The apparatus for controlling discrete data in a disk overwrite area or a power calibration area of claim 15, wherein said control signal-processing unit includes a second decision unit for issuing said load control signal, if the value of said counter is equal to said second parameter, said clock recovery circuit executes a parameter for a loading operation.

19. The apparatus for controlling discrete data in a disk overwrite area or a power calibration area of claim 15, wherein said control signal-processing unit includes a third decision unit for issuing said increasing bandwidth, if the value of said counter is greater than said second parameter, said clock recovery circuit executes the operation of increasing bandwidth.

20. The apparatus for controlling discrete data in a disk overwrite area or a power calibration area of claims 18, wherein said second parameter is an ending time for reading said overwrite area or said power calibration area.

21. The apparatus for controlling discrete data in a disk overwrite area or a power calibration area of claim 15, wherein said control signal-processing unit is a fourth decision unit for issuing said increasing bandwidth control signal, if the value of said counter is greater than said second parameter and smaller than said third parameter, said clock recovery circuit executes the operation of increasing bandwidth.

22. The apparatus for controlling discrete data in a disk overwrite area or a power calibration area of claim 21, wherein said second parameter is a starting time for reading said overwrite area or said power calibration area, and said third parameter is a starting time for reading a next record of data.

23. An optical disc drive comprising:
an optical pickup head for accessing an optical disc to generate an radio frequency signal;
a signal-processing module for processing the radio frequency signal according to a parameter to generate a digital signal;
an address-processing unit, coupled to the signal-processing module, for decoding the digital signal to generate data-sync signal or data-address signal, and decoding an wobble signal to generate wobble-sync signal or wobble-address signal;
a control unit, coupled to the address-processing unit, for generating a hold control signal according to the data-sync signal, the data-address signal, the wobble-sync signal, or the wobble-address signal; and
a parameter control module coupled to the signal-processing module and the control unit for transmitting the parameter to the signal-processing module; wherein the parameter control module maintains in a hold state according to the hold control signal.

24. The optical disc drive of claim 23, wherein the signal-processing module comprises:
a signal-processing unit for receiving the radio frequency signal and generating the digital signal, comprising an amplifier, a slicer, an equalizer, and an analog-digital converter.

25. The optical disc drive of claim 24, wherein the parameter control module comprises:
a signal-processing unit parameter control unit, coupled to the signal-processing unit and the control unit, for transmitting the parameter to the signal-processing unit; wherein the signal-processing unit parameter control unit maintains in the hold state according to the hold control signal.

26. The optical disc drive of claim 24, wherein the signal-processing module further comprises:
a clock recovery unit, coupled to the signal-processing unit, for receiving the digital signal and generating a clock signal according to a clock recovery parameter.

27. The optical disc drive of claim 26, wherein the parameter control module comprises:
a clock recovery parameter control unit, coupled to the control unit and the clock recovery unit, for transmitting the clock recovery parameter to the clock recovery unit; wherein the clock recovery parameter control unit maintains in the hold state according to the hold control signal.

28. The optical disc drive of claim 23, wherein the control unit comprises:
a counter for counting a clock signal to provide a count value; and
a decision unit, coupled to the counter, for receiving the count value and generating the hold control signal if the count value is greater than a first threshold value and less than a second threshold value;
wherein the first threshold value is corresponding to a start position of an overwrite area or a power calibration area in the optical disc; the second threshold value is corresponding to an end position of the overwrite area or the power calibration area.

29. The optical disc drive of claim 28, wherein the counter is reset according to the data-sync signal or the wobble-sync signal.

30. A method for processing signal for an optical disc drive, the method comprising the following steps:
accessing an optical disc by an optical pickup head to generate a radio frequency signal;
processing the radio frequency signal by a signal-processing module according to a parameter to generate a digital signal;
decoding the digital signal to generate a data-sync signal or a data-address signal, and decoding an wobble signal to generate an wobble-sync signal or an wobble-address signal;
generating a hold control signal according to the data-sync signal, the data-address signal, the wobble-sync signal, or the wobble-address signal; and
holding the operation of transmitting the parameter to the signal-processing module according to the hold control signal.

31. The method of claim 30, wherein the step of processing the radio frequency signal comprises:
generating a clock signal by a clock recovery unit according to a clock recovery parameter and the digital signal.

32. The method of claim 31, wherein the step of holding the operation transmitting the parameter comprises:
holding of the operation of transmitting the clock recovery parameter to the clock recovery unit according to the hold control signal.

33. The method of claim 30, wherein the step of generating the hold control signal comprises:
counting a clock signal to provide a count value; and
generating the hold control signal if the count value is greater than a first threshold value and less than a second threshold value;
wherein the first threshold value is corresponding to a start position of an overwrite area or a power calibration area in the optical disc; the second threshold value is corresponding to an end position of the overwrite area or the power calibration area.

34. The method of claim 33, wherein the count value is reset according to the data-sync signal or the wobble-sync signal.

35. An optical disc drive comprising:
an optical pickup head for accessing an optical disc to generate an radio frequency signal;
a signal-processing module for processing the radio frequency signal according to a parameter to generate a digital signal;
an address-processing unit, coupled to the signal-processing module, for decoding the digital signal to generate data-sync signal or data-address signal, and decoding an wobble signal to generate wobble-sync signal or wobble-address signal;
a control unit, coupled to the address-processing unit, for generating a load control signal according to the data-sync signal, the data-address signal, the wobble-sync signal, or the wobble-address signal; and
a parameter control module coupled to the signal-processing module and the control unit for transmitting the parameter to the signal-processing module; wherein the parameter control module loads the parameter to the signal-processing module according to the load control signal.

36. The optical disc drive of claim 35, wherein the signal-processing module comprises:
a signal-processing unit for receiving the radio frequency signal and generating the digital signal, comprising an amplifier, a slicer, an equalizer, and an analog-digital converter.

37. The optical disc drive of claim 36, wherein the parameter control module comprises:
a signal-processing unit parameter control unit, coupled to the signal-processing unit and the control unit, for transmitting the parameter to a signal-processing unit according to the load control signal.

38. The optical disc drive of claim 36, wherein the signal-processing module further comprises:
a clock recovery unit, coupled to the signal-processing unit, for receiving the digital signal and generating a clock signal according to a clock recovery parameter.

39. The optical disc drive of claim 38, wherein the parameter control module comprises:
a clock recovery parameter control unit, coupled to the control unit and the clock recovery unit, for transmitting the clock recovery parameter to the clock recovery unit according to the load control signal.

40. The optical disc drive of claim 35, wherein the control unit comprises:
a counter for counting a clock signal to provide a count value; and
a decision unit, coupled to the counter, for receiving the count value and generating the load control signal if the count value equals to a threshold value;
wherein the threshold value is corresponding to an end position of the overwrite area or the power calibration area.

41. The optical disc drive of claim 40, wherein the counter is reset according to the data-sync signal or the wobble-sync signal.

42. A method for processing signal for an optical disc drive, the method comprising the following steps:
accessing an optical disc by an optical pickup head to generate a radio frequency signal;
processing the radio frequency signal by a signal-processing module according to a parameter to generate a digital signal;
decoding the digital signal to generate a data-sync signal or a data-address signal, and decoding an wobble signal to generate an wobble-sync signal or an wobble-address signal;
generating a load control signal according to the data-sync signal, the data-address signal, the wobble-sync signal, or the wobble-address signal; and
transmitting the parameter to the signal-processing module according to the load control signal.

43. The method of claim 42, wherein the step of processing the radio frequency signal comprises:
generating a clock signal by a clock recovery unit according to a clock recovery parameter and the digital signal.

44. The method of claim 42, wherein the step of transmitting the parameter comprises:
transmitting the clock recovery parameter to the clock recovery unit according to the load control signal.

45. The method of claim 42, wherein the step of generating the load control signal comprises:
counting a clock signal to provide a count value; and
generating the load control signal if the count value equals to a threshold value;
wherein the threshold value is corresponding to an end position of the overwrite area or the power calibration area.

46. The method of claim 45, wherein the count value is reset according to the data-sync signal or the wobble-sync signal.

47. An optical disc drive comprising:
an optical pickup head for accessing an optical disc to generate an radio frequency signal;
a signal-processing module for processing the radio frequency signal according to a parameter to generate a digital signal;
an address-processing unit, coupled to the signal-processing module, for decoding the digital signal to generate data-sync signal or data-address signal, and decoding an wobble signal to generate wobble-sync signal or wobble-address signal;
a control unit, coupled to the address-processing unit, for generating an increasing bandwidth control signal according to the data-sync signal, the data-address signal, the wobble-sync signal, or the wobble-address signal; and
a parameter control module coupled to the signal-processing module and the control unit for transmitting the parameter to the signal-processing module for increasing the bandwidth of the signal-processing module according to the increasing bandwidth control signal.

48. The optical disc drive of claim 47, wherein the signal-processing module comprises:
a signal-processing unit for receiving the radio frequency signal and generating the digital signal, comprising an amplifier, a slicer, an equalizer, and an analog-digital converter.

49. The optical disc drive of claim 48, wherein the parameter control module comprises:
a signal-processing unit parameter control unit, coupled to the signal-processing unit and the control unit, for transmitting the parameter to the signal-processing unit according to the increasing bandwidth control signal.

50. The optical disc drive of claim 49, wherein the signal-processing module further comprises:

a clock recovery unit, coupled to the signal-processing unit, for receiving the digital signal and generating a clock signal according to a clock recovery parameter.

51. The optical disc drive of claim 50, wherein the parameter control module comprises:
a clock recovery parameter control unit, coupled to the control unit and the clock recovery unit, for transmitting the clock recovery parameter to the clock recovery unit according to the increasing bandwidth control signal.

52. The optical disc drive of claim 47, wherein the control unit comprises:
a counter for counting a clock signal to provide a count value; and
a decision unit, coupled to the counter, for receiving the count value and generating the increasing bandwidth control signal if the count value is greater than a second threshold value and less than a third threshold value;
wherein the second threshold value is corresponding to an end position of the overwrite area or the power calibration area; the third threshold value is corresponding to a start position of a next record data.

53. The optical disc drive of claim 52, wherein the counter is reset according to the data-sync signal or the wobble-sync signal.

54. A method for processing signal for an optical disc drive, the method comprising the following steps:
accessing an optical disc by an optical pickup head to generate a radio frequency signal;
processing the radio frequency signal by a signal-processing module according to a parameter to generate a digital signal;
decoding the digital signal to generate a data-sync signal or a data-address signal, and decoding an wobble signal to generate an wobble-sync signal or an wobble-address signal;
generating an increasing bandwidth control signal according to the data-sync signal, the data-address signal, the wobble-sync signal, or the wobble-address signal; and
transmitting the parameter to the signal-processing module for increasing the bandwidth of the signal-processing module according to the increasing bandwidth control signal.

55. The method of claim 54, wherein the step of processing the radio frequency signal comprises:
generating a clock signal by a clock recovery unit according to a clock recovery parameter and the digital signal.

56. The method of claim 54, wherein the step of transmitting the parameter comprises:
transmitting the clock recovery parameter to the clock recovery unit for increasing the bandwidth of the clock recovery unit according to the increasing bandwidth control signal.

57. The method of claim 54, wherein the step of generating the increasing bandwidth control signal comprises:
counting a clock signal to provide a count value; and
generating the increasing bandwidth control signal if the count value is greater than a first threshold value and less than a second threshold value;
wherein the first threshold value is corresponding to an end position of the overwrite area or the power calibration area; the second threshold value is corresponding to a start position of a next record data.

58. The method of claim 57, wherein the count value is reset according to the data-sync signal or the wobble-sync signal.

* * * * *